(12) United States Patent
Mantelatto

(10) Patent No.: US 8,475,597 B2
(45) Date of Patent: Jul. 2, 2013

(54) PROCESS AND EQUIPMENT FOR SUGAR CRYSTALLIZATION BY CONTROLLED COOLING

(75) Inventor: Paulo Eduardo Mantelatto, Piracicaba-SP (BR)

(73) Assignee: Dedini S/A Industrias de Base, Piracicaba (BZ)

( * ) Notice: Subject to any disclaimer, the term of this patent is extended or adjusted under 35 U.S.C. 154(b) by 455 days.

(21) Appl. No.: 12/738,203

(22) PCT Filed: Oct. 15, 2008

(86) PCT No.: PCT/BR2008/000316
§ 371 (c)(1),
(2), (4) Date: Jun. 17, 2010

(87) PCT Pub. No.: WO2009/049391
PCT Pub. Date: Apr. 23, 2009

(65) Prior Publication Data
US 2010/0275907 A1    Nov. 4, 2010

(30) Foreign Application Priority Data

Oct. 16, 2007   (BR) ...................................... 0705181

(51) Int. Cl.
    *C13B 30/02*    (2011.01)
(52) U.S. Cl.
    USPC ............................................................. 127/58
(58) Field of Classification Search
    None
    See application file for complete search history.

(56) References Cited

U.S. PATENT DOCUMENTS 1,868,406 A * 7/1932 Bonath ............................ 127/15
5,133,807 A * 7/1992 De Cremoux .................. 127/15

FOREIGN PATENT DOCUMENTS

| DE | 2821129 | | 11/1979 |
|----|---------|---|---------|
| DE | 2924214 | | 2/1981 |
| DE | 2924214 A | * | 2/1981 |
| DE | 2954411 | | 10/1986 |
| FR | 2461754 | | 2/1981 |
| GB | 2147217 | | 5/1985 |
| GB | 2147217 A | * | 5/1985 |
| GB | 2200856 | | 8/1988 |

* cited by examiner

*Primary Examiner* — Melvin C Mayes
*Assistant Examiner* — Stefanie Cohen
(74) *Attorney, Agent, or Firm* — Fish & Richardson P.C.

(57) ABSTRACT

A process is proposed for crystallizing, by progressively cooling, in multiple stages arranged in series in a crystallization vessel (10), a descending continuous flow of a saturated sucrose solution at a temperature from about 78° to about 120° C., each stage maintaining the sucrose solution being crystallized at a predetermined temperature, until reaching a temperature from about 25 to 40° C., obtaining substantially pure sucrose crystals. A suspension containing sugar seeds is introduced in the crystallizing equipment, in the first stage, jointly with the saturated sucrose solution of 1.05-1.15. In another embodiment of the invention, the saturated solution is fed and its temperature is controlled, already in the first stage of the vessel (10), to obtain a supersaturation between 1.05 and 1.15, inducing the formation of small crystals used as crystallization seeds.

29 Claims, 2 Drawing Sheets

PROCESS AND EQUIPMENT FOR SUGAR CRYSTALLIZATION BY CONTROLLED COOLING

CROSS REFERENCE TO PRIOR APPLICATIONS

This is the U.S. National Phase application under 35 U.S.C. §371 of International Patent Application No. PCT/BR2008/000316, filed Oct. 15, 2008, and claims the priority of Brazilian Patent Application No. PI0705181-6, filed Oct. 16, 2007 both of which are incorporated by reference herein. The International Application published in English on Apr. 23, 2009 as WO 2009/049391 under PCT Article 21(2).

FIELD OF THE INVENTION

The present invention refers to a process and to an equipment for crystallizing, by controlled cooling, a saturated sugar solution contained in a crystallizer, from a high temperature to an ambient temperature, in order to obtain substantially pure sucrose crystals, after the crystallized mass, effluent from said crystallizer, is submitted to centrifugation.

BACKGROUND OF THE INVENTION

The prior art comprises a production process in which the raw material used for obtaining crystals of high purity and quality is the syrup or raw crystal sugar in its several types: white crystal sugar, sugar B, sugar C (magma), VHP (very high polarization) sugar, VVHP (very, very high polarization) sugar and organic crystal sugar, or combinations between the several types of sugar and/or syrup.

The conventional process for producing raw crystal sugar from sugar cane is very well described in the literature in HONIG (1953), HUGOT (1969), MEADE & CHEN (1977), MEADE (1963) and VAN DER POEL et al. (1998). There are few variations in the conventional process of manufacturing white sugar from sugar cane in Brazil and abroad. Apart from small variations, which are inherent to the production of some special types of sugar, the unitary operations involved can be described ahead. The manually or mechanically harvested cane is sent to the mill, where it is cleaned (via a dry or wet process), then submitted to a preparation process in which it is chopped and defibered, submitted to extraction, which can be effected in multi-stage (usually 4 to 6) countercurrent mills, where the cane receives the addition of water in the last stage, provided by diffusers, not very common in Brazil.

This initial process generates the bagasse, which is sent to be burned in boilers (of medium or high pressure) to generate steam and electric energy, as well as the mixed juice, which is sent to treatment to produce sugar and alcohol.

In the combined mills, generally about 50% of the processed cane is destined to sugar manufacture and 50% to the production of alcohol.

The juice destined to the production of alcohol undergoes specific physical-chemical treatment and is sent to the fermentation vessels, jointly with the exhausted final run-off syrup (mother liquor) resulting from the production of sugar.

The mixed juice destined to sugar manufacture is submitted to an operation of separating the bagacillo in cush-cush type screen (and/or rotary screens) is heated to about 40° C. and conveyed to the sulfitation step (usually in columns or hydro-ejectors) where, by addition of sulfur dioxide resulting from sulfur burning in the burners, has its pH reduced to about 4.0- to 4.5. After sulfitation, the juice receives the addition of lime milk (or calcium saccharate), where the pH is elevated to about 7.0-7.2. The limed (or dosed) juice is then heated to about 105° C., and subsequently undergoes a vaporization process ("flash balloon") for removing dissolved gases, receives the addition of a flocculating agent (usually a polyacrylamide polyelectrolyte), being then submitted to decantation in static decanters (with or without trays). This operation is also commonly known as clarification. Two streams result from the clarification process: a sludge stream and a clarified juice stream. The sludge, after being added with bagacillo (a type of "natural filtrating means"), receives the addition of lime milk and, eventually, polyelectrolyte, and is then filtrated in vacuum rotary filters or belt press filters, thus giving rise to the filter cake, which is used in agriculture, as well as the filtrated juice, which is re-conducted to the process. The obtained clarified juice is sent to evaporation in multiple effect vacuum evaporators (usually Robert type evaporators with 4 or 5 stages), yielding a concentrate juice known as syrup, with a concentration of about 65° Brix. In the first evaporation stage, normally denominated pre-evaporation, a vapor bleeding is effected to utilize said vapor in the operations of evaporation-crystallization, of heating the mixed juice and of distillation in the production of alcohol.

The syrup obtained in the evaporation is conveyed to the subsequent crystallization step, which is carried out in vacuum calendar type evaporating crystallizers in systems with two or three masses. Generally, the conventional crystallization process takes from 3 to 5 hours, and the crystal mass thus obtained is conveyed to horizontal crystallizers provided with a cooling jacket, until reaching the ambient temperature. The final mass is then submitted to a centrifugation cycle, in basket centrifuges, in which the crystals are washed upon application of water and steam and then conducted to the drying and bagging steps. The run-off syrup obtained in the centrifugation is re-used in the cooking operations for obtaining the second sugar (sugar B or magma) and, eventually, the third sugar (sugar C or magma), which are also re-circulated in the first sugar manufacturing process.

The process of producing VHP and VVHP sugar is practically the same as that employed in the production of white crystal sugar, with the difference that, for producing VHP, the sulfitation process is not used. In the VVHP producing process, besides not using sulfitation, there is eventually provided correction of the phosphate levels of the juice, and the syrup receives the addition of α-amylase and/or dextranase for hydrolyzation of the starch and dextran, respectively, when necessary.

The process for making organic sugar is practically the same as that employed in the production of the white crystal sugar, with the difference that chemical inputs are not used in the processing thereof, and that both the cultivation of sugar cane and the sugar production process follow principles of self-sustainability.

In the present process, the syrup, the solutions obtained from the dissolution of raw sugar (white crystal sugar, VHP sugar, VVHP sugar, VVHPC sugar, sugar B, sugar C, and organic sugar) in water, and mixtures thereof, which are the raw material used, will be generically denominated herein as sugar solution.

Before proceeding to the detailed description of the object of the present invention, it is important to present the several possibilities of effecting the sucrose crystallization, as described below.

There are basically three ways of carrying out the crystallization: by isothermal evaporation, by flash evaporation or by cooling. In all these forms, the objective is to start from the undersaturated zone, in which crystals are not present, and proceed until the metastable zone, in which occurs the formation and growth of crystals.

In the isothermal evaporation process, the solution is evaporated, maintaining a constant temperature of the vapor phase until the crystals have been obtained. In the flash evaporation system, the solvent is removed from the solution by evaporation effected under variable pressure, normally by means of vacuum and associated with temperature reduction. And, finally, the crystallization by cooling is carried out, starting with a saturated solution at a higher temperature, which is successfully cooled to a metastable zone for obtaining the crystal growth, therefore without evaporation.

Independently of the way used for carrying out the crystallization, the quality of the crystals obtained regarding aspects such as uniformity of granulometric distribution, color, purity, gloss and morphology of the crystals are intimately correlated with crystallization kinetics. An extense bibliographic list treats this matter in details, for example Van der Poel (VAN DER POEL, P. H., SCHIWECK, H., SCHWARTZ, T., Sugar Technology: Beet and Cane Sugar Manufacture, Dr. Albert Bartens, Berlin, 1998), Van Hook (VAN HOOK, W. A., MANTOVANI, G., MATHALOUTHI, M., Sucrose Crystallization—Science and Technology. Dr. Albert Bartens, Berlin, 1997), Mersmann (MERSMANN, A.—Crystallization Technology Handbook, Marcel Dekker, Inc, 1995), Mantelatto (MANTELATTO, P. E.—Study on the process for the crystallization of impure sucrose solutions of sugar cane by cooling, Master Degree thesis-(PPG-EQ/UF-SCAR), 2005), Nyvlt (NÝVLT, J., SÖHNEL, O.; MATU-CHOVÁ, M.; BROUL, M.; The Kinetics of Industrial Crystallization, Prague Academy, 1985), Giulietti (NÝVLT, J., Hostomský, J., Giulietti, M.: Crystallization, São Paulo, Brazil, IPT/UFSCar, 2001). Knowledge on the crystallization kinetics and its perfect control has been a long imperative desire in all crystallizer projects. Several authors have demonstrated that, by controlling the crystallization kinetics, it is possible to obtain high levels of removal of color, ashes, starch, dextran and reducing sugars. For example, Mantelatto (MANTELATTO, P. E.—Study on the process for crystallization of impure sucrose solutions of sugar cane by cooling, Master Degree Thesis-(PPG-EQ/UFSCAR), 2005), in which crystallization by cooling was carried out in batches, by agitation in a 10 L crystallizer, on the laboratory bench, obtaining the following results: sugar crystals having a color of 14 IU, starting from VVHP sugar having an original color of 310 IU; of 56 IU from VHP sugar with original color of 1040 IU; and of 22 IU from VHP sugar having an original color of 846 IU. It is also pointed out that the crystals obtained presented an excellent variation coefficient, VC, between 6.9% (best case) and 28% (worst case), proving the distribution is very uniform and little dispersed, mainly in the case where seeding was used. Moreover, the process proved to be effective in the removal of impurities, such as starch and ashes, obtaining, for determined cooling rates, a removal index very close to 100%.

In sugar manufacture, there are several types of equipment employed, according to the purity of the mass under crystallization process. For mass A, of high purity, for example 85 to 92%, most equipment used are of the batch vacuum evaporating crystallizers type provided with a steam-heated calendar. For mass B, with intermediate impurity, for example between 72 and 75%, are used the same batch equipment as that employed for mass A, as well as multi-compartment horizontal continuous evaporating crystallizers, horizontal batch evaporating crystallizers of the cascade type and vertical batch evaporating crystallizers of the cascade type. For mass C, the batch models can be used, identical to those used for masses A and B, multi-compartment horizontal continuous evaporating crystallizers, and also horizontal batch evaporating crystallizers of the cascade type, and vertical batch evaporating crystallizers of the cascade type. All these models and applications thereof are very well described in the literature, for example, in Van der Poel (VAN DER POEL, P. H., SCHIWECK, H., SCHWARTZ, T., Sugar Technology: Beet and Cane Sugar Manufacture, Dr. Albert Bartens, Berlin, 1998) and Hugot (HUGOT, E., Sugar Engineering Manual, Translated by MIOCQUE, I., Vol. 1 and Vol. 2, Mestre Jou Publishing Co., São Paulo-SP, Brazil, 1969).

As related in literature and also from industrial practice, the continuous crystallization processes are successfully applied in crystallizers of low and medium purity mass, for intermediate sugars B and C. For mass A (high purity), although several manufacturers propose the use of the horizontal continuous evaporating crystallizers or vertical evaporating crystallizers of the cascade type, which have been only used for crystallizing masses of low purity or intermediate purity, in practice, it is verified that the quality of the sugar thus obtained is still very bad. In this type of application, one can verify a strong formation of incrustation, agglomeration of crystals, bad crystal distribution curve (high variation coefficient), and even incorporation of color in the crystals by occlusion and inclusion, besides degradation of reducing sugars.

SUMMARY OF THE INVENTION

As a function of the prior art limitations, the present invention has, as objective, to provide a process and an equipment for producing high purity crystallized sugar from impure sucrose solutions obtained from sugar cane or beetroot, by using a crystallizer with a programmed cooling which operates with syrup and mixtures of raw sugar and syrup.

The present invention yields a crystal sugar presenting a color, for example between 50-150 IU when operating with syrup and mixtures of raw sugar and syrup, and a granulated refined sugar, of high purity and low color, for example between 35-45 IU, when the raw material used is the raw crystal sugar and/or mixtures thereof.

According to one aspect of the invention, there is provided a process for sugar crystallization by controlled cooling, comprising the step of progressively cooling, in multiple stages arranged in series in a crystallizer, a continuous descending flow of a saturated sucrose solution, at a temperature from about 78° C. to under crystallization at a predetermined temperature.

Still according to the invention, there is provided an equipment for sugar crystallization by controlled cooling, comprising a generally cylindrical vessel which is vertically disposed and provided with: a sucrose solution upper inlet; a crystallized mass lower outlet; a plurality of heat exchangers disposed in the interior of the cylindrical vessel, in different planes transversal to the axis of the latter and each defining a respective crystallization stage, said heat exchangers remaining immersed in a volume of sucrose solution contained in and passing, in a descending continuous flow, through the interior of the cylindrical vessel, each heat exchanger receiving a heat exchange fluid at controlled temperature and flow rate, so as to maintain the sucrose solution being crystallized at a predetermined temperature, in each crystallization stage of the cylindrical vessel; a temperature sensor disposed in the interior of the cylindrical vessel, in each crystallization stage; and an electronic control module, operatively associated with the temperature sensors, in order to control the temperature and flow rate of the heat exchange fluids, in each crystallization stage, as a function of the detected temperature.

BRIEF DESCRIPTION OF THE DRAWINGS

The invention will be described below, with reference being made to the appended drawings, given by way of example of a possible way of carrying out the invention, and in which.

DETAILED DESCRIPTION OF THE INVENTION

Figure 1:
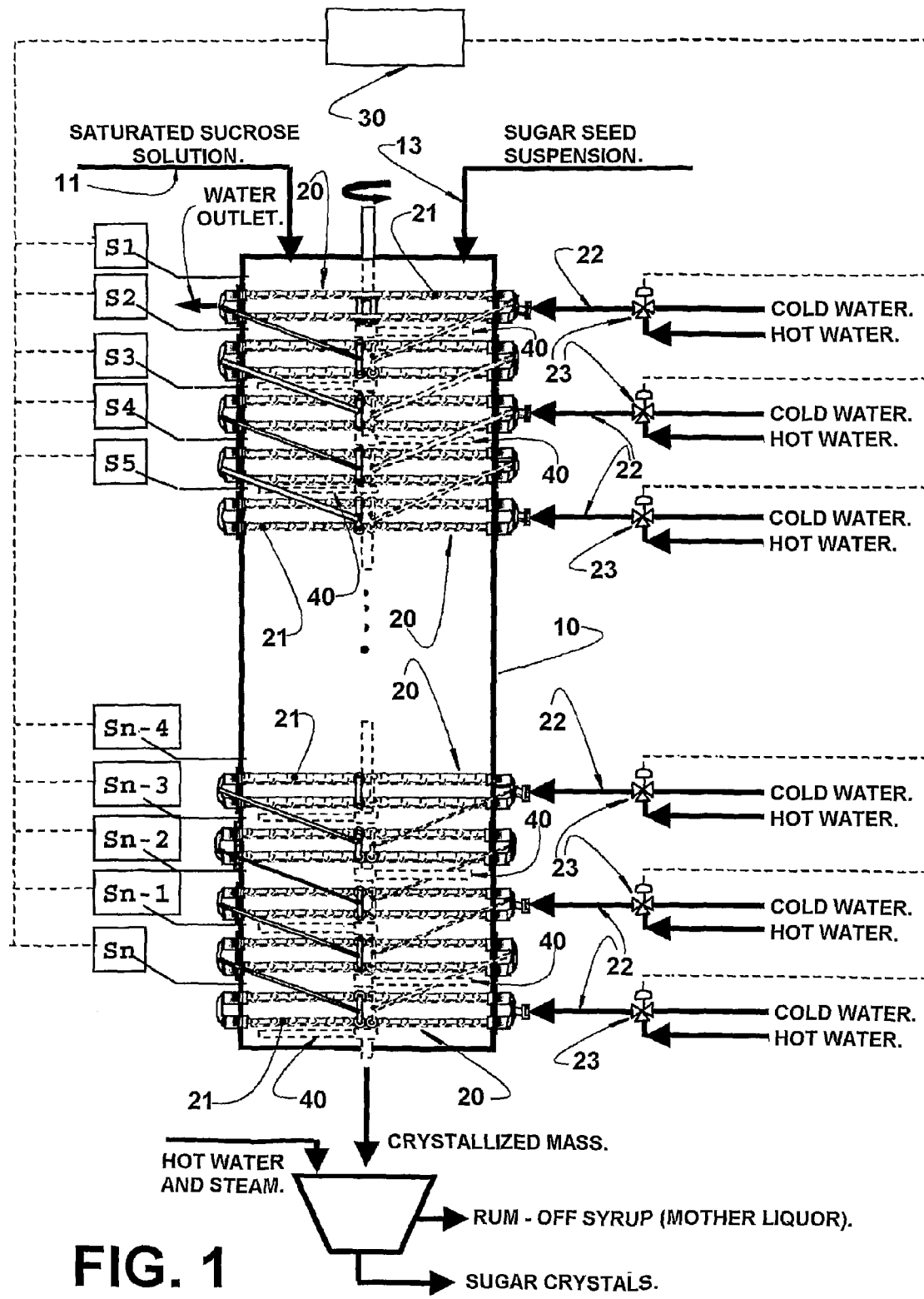
FIG. 1 represents a schematic diagrammatic vertical sectional view of a crystallization equipment, constructed according to the present invention and inferiorly associated, in a flowchart form, with a centrifugation equipment.

In a first way of carrying out the present invention, the sugar crystallization process by controlled cooling comprises the step of feeding, in the top region of a generally cylindrical vessel 10, vertically disposed and defining a crystallizer, a saturated sucrose solution presenting a purity between 80 and 98%, at a relatively high temperature, from about 78° C. to about 120° C. The sucrose solution can be obtained from sugar cane or from beetroot.

The sucrose solution considered in the present invention can be obtained: from a syrup that is discolored in ion exchange and/or activated coal columns; from a mixture of syrup and dissolved raw crystal sugar discolored in ion exchange and/or activated coal columns; from a mixture of syrup and dissolved raw crystal sugar and run-off syrups effluent from the sugar manufacture process and discolored in ion exchange and/or activated coal columns; or from mixtures of syrup and run-off syrups resulting from the sugar manufacture process.

The equipment proposed by the present invention comprises a vessel 10 constructed in any adequate material, such as, for example, stainless steel, and provided with an upper inlet 11 for feeding a saturated sucrose solution, and a lower outlet 12 for the crystallized mass. The vessel 10 carries, internally, a plurality of heat exchangers 20 disposed in different planes transversal to the axis of the vessel 10 along the height of the latter. Each heat exchanger 20 defines, in the interior of the vessel 10, a respective crystallization stage for a volume of saturated sucrose solution contained in the interior of the vessel 10 and passing through the interior of the latter, in a descending continuous flow, as the sucrose solution is being crystallized.

Each heat exchanger 20 may be constructed in the form of a coil 21, having an inlet 21a connected to a tube 22 for feeding a heat exchange fluid, which can be cold water, heated water, saturated steam and superheated water, and an outlet 21b which is connected to the inlet 21a of a coil 21 of the heat exchanger 20 disposed immediately above, and so successively, until the upper heat exchanger 20 of the vessel 10, whose outlet 21b of the coil 21 conveys the heat exchange fluid outwardly from the equipment, to be discarded or recycled for a new feeding through the inlet 21a of the coil 21 of the lower heat exchanger 20.

Figure 2:
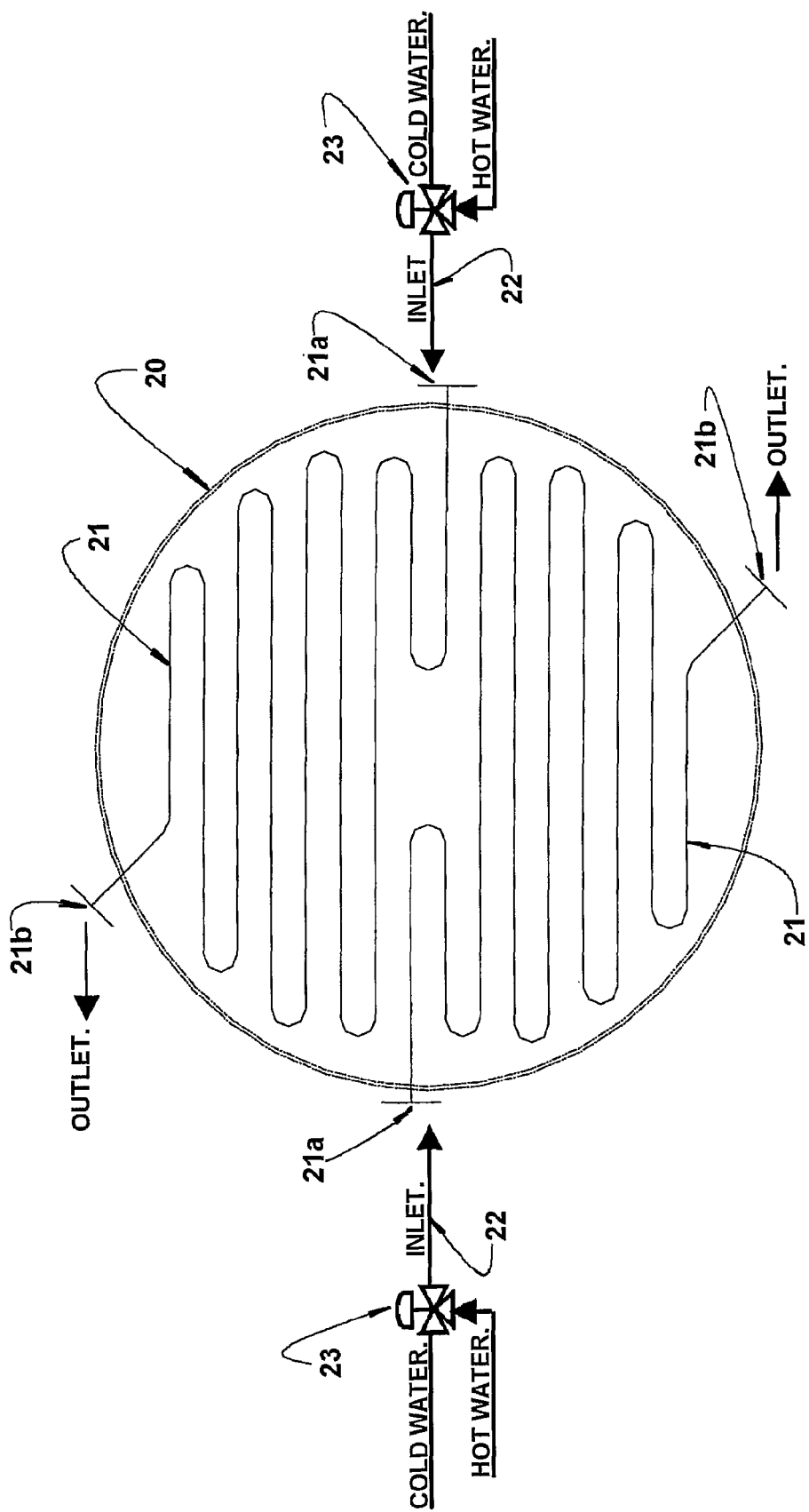
FIG. 2 represents a plan view of a heat exchanger element, for controlling the temperature of the sucrose solution, and defining a respective crystallization stage of the equipment.

In the construction illustrated in FIG. 2, each heat exchanger 20 comprises two coils 21, which are coplanar to each other and disposed in a plane transversal to the axis of the vessel 10, each of them occupying half the cross-sectional area of the vessel 10 and presenting an inlet 21a and an outlet 21b, the outlet 21b of a coil 21 being connected to the inlet 21a of the coil 21 of the heat exchanger 20 situated in the opposite half of the cross-sectional area of the vessel 10.

The coils 21 may be constructed in any adequate tubular material, for example, stainless steel. Each of the coils, except the lower and the upper coils, has the inlet 21a thereof connected to a heat exchange fluid source, through a tube 22 provided with a control valve 23, so that the temperature of the sucrose solution, in each crystallization stage, is maintained in a predetermined value.

The equipment proposed by the present invention further comprises temperature sensors S1, S2, S3, S4 . . . Sn–4, Sn–3, Sn–2, Sn–1 and Sn, mounted in the interior of the vessel 10, in each crystallization stage, to produce signals representative of the temperature detected in each said crystallization stage, said temperature sensors being operatively associated with an electronic control module 30 provided with a processor, for processing the temperature signals received from the temperature sensors S1 . . . Sn and determining, by actuation of the control valves 23 and as a function of the characteristics of the sucrose saturated solution being supplied to the cylindrical vessel and also of the sugar to be obtained, the flow rates and the temperatures of the heat exchange fluid supplied to each heat exchanger 20, for keeping the saturated sucrose solution at a predetermined temperature in each crystallization stage.

According to the process, the sucrose saturated solution fed to the top of the vessel 10 is caused to pass, in a descending continuous flow which can be defined as a descending plug flow, in between the heat exchangers 20 that define the different crystallization stages. As the sucrose solution contained in the interior of vessel 10 is conveyed in a descending flow, its temperature is gradually reduced, as it progresses through each stage. Between each two heat exchangers 20 of the several crystallization stages, that is, cooling stages, there are provided mechanical agitators 40, of low rotation and preferably of the inclined paddle type, to guarantee concentration and temperature uniformity in each respective stage. Already in the first stage, defined in the upper part of the vessel 10 of the crystallizer, the temperature is controlled so as to obtain a supersaturation from about 1.01 to 1.20, more preferably from 1.05 to 1.15 and still more preferably of 1.10. In this stage, there is introduced, through an upper inlet 13 of the vessel 10, a suspension of crystal sugar seeds, which are previously prepared in an average crystal size between 50 and 300 µm, with the crystal content situated between 5 and 55% (weight/weight). Thus, after the introduction of the seed suspension, in the subsequent stages, the crystals will grow as the sucrose solution flow runs in the downward direction and is cooled upon passing through the several stages. In the last stage, located in the bottom of the vessel 10 of the crystallizer, the temperature is of the order of 25-50° C. and the crystals have a size in the range between 0.30 and 1.00 mm. However, this average size can be adjusted as a function of the retention time and initial population of the crystals formed in the first crystallization stage. The number of crystallization stages contained in the interior of the crystallizer should be from 5 to 50, more preferably from 10 to 20, depending on the initial feeding temperature, which depends upon the purity and concentration of the sucrose solution.

The controlled crystallization process of the sucrose solution using a descending continuous flow equipment comprises, according to another way of carrying out the invention, the steps of feeding, through the top of the vessel 10 of the crystallizer, a saturated sucrose solution containing a purity between 80 and 98%, at a relatively high temperature, from about 78° to 120° C., making said sucrose solution pass downwardly through the heat exchangers 20.

The saturated sucrose solution flows, downwardly, and its temperature is progressively reduced, stage by stage, in the same manner as described before, regarding the other modality of the invention, in which is included the step of feeding a suspension of sugar crystal seeds through an upper inlet 13 of the vessel 10.

The sucrose solution is also submitted to mechanical agitation between the different crystallization stages, and the temperature is likewise controlled in the first stage for obtaining a super saturation from about 1.01 to 1.20, preferably from 1.05 to 1.15 and, still more preferably, of 1.10.

In this modality of the invention, the formation of small crystals is induced in the first stage, which crystals are known as "crystallization seeds or germs". Thus, in the subsequent stages, the crystals grow as the flow proceeds downwardly, passing through the heat exchangers 20 in the several crystallization stages. In the last stage, located in the bottom of the vessel 10 of the crystallizer, the temperature is of the order of 25-50° C. and the crystals have a size ranging from 0.30 to 1.00 mm, which average size can be adjusted as a function of the retention time and the initial population of the crystals formed in the first crystallization stage.

The number of crystallization/temperature control stages, defined in the interior of the crystallizer vessel 10, is preferably from 5 to 50, more preferably from 10 to 20, depending on the initial feeding temperature, which is a function of the purity and concentration of the saturated sucrose solution.

For example, for an initial temperature of the sucrose saturated solution of 95° C. and for a final temperature of the crystallized mass of 35° C., in a crystallizer vessel 10 containing 11 cooling stages, the temperature linear profile maintained in each stage in the descending flow is: stage 1: 95° C.; stage 2: 89° C.; stage 3: 83° C.; stage 4: 77° C.; stage 5: 71° C.; stage 6: 65° C.; stage 7: 59° C.; stage 8: 53° C.; stage 9: 47° C.; stage 10: 41° C. and stage 11: 35° C.

In both ways of carrying out the invention, the heat exchange fluid, for example, hot water and cold water (at a substantially ambient temperature) is preferably controllably admitted in the heat exchangers 20, according to a predefined temperature for each crystallization stage. If necessary, superheated water or steam is admitted in place of hot water, in the case of stages that operate above the boiling temperature of hot water at atmospheric pressure (for example 100° C. at sea level). In this process, the water, at ambient temperature, is supplied in the inlets 21a of the coils 21 of the lower heat exchanger 20, each inlet pertaining to one of the two coils 21 that form each heat exchanger 20 in the constructive example illustrated in FIG. 2. Water at ambient temperature, admitted in the interior of the coil 21 constitutive of the heat exchangers 20, exchanges heat with the sucrose solution in the respective stage, which water is heated and conveyed to the heat exchanger 20 situated in the stage immediately above, and fed to the inlet 21a of the opposite coil 21, as already mentioned before when the equipment was described. The same occurs with the other coil 21 of the heat exchanger 20 and for the other crystallization stages disposed in an ascending sequence.

As already mentioned, each heat exchanger 20 can further receive an additional flow of heat exchange fluid (hot or cold water), if necessary, in order to maintain the stage temperature within the pre-established level.

The temperature profile as established herein, decreasing in the descending longitudinal direction, on the side of the mass under crystallization process further allows, in each of the stages maintained at different temperatures, the occurrence of stratification due to differences of density, which increases in the ascending direction, without requiring physical barriers to be placed between the crystallization stages.

The thus crystallized mass, after the conventional centrifuging and drying process, as diagrammatically illustrated in FIG. 1, yielding a sugar solution and crystal sugar with the following characteristics:
i) starting from sugar solutions with a color between 5000 and 15000 IU, it is possible to obtain crystal sugar presenting a color, for example between 50 and 150 IU;
ii) starting from sugar solutions with a color between 3000 and 4500 IU, it is possible to obtain crystal sugar presenting a color, for example of 35-55 IU; and
iii) for a solution with a color between 400 and 3000 IU, it is possible to obtain sugar with a color between 15 and 40 IU.

For all these cases, starting from sugar solutions with a purity of 80-98%, the crystal average size can range between 0.3 and 1.0 mm and the coefficient of variation (CV) can range between 15 and 30%.

In one of the preferred forms of the present invention, the present process allows the crystallization by cooling to be used as a technique for producing crystal sugar of high purity and, in the other way of carrying out the invention, to be used for continuous sugar refinement, adopting adequate concentration and cooling rates. In this type of application, the technique of refining raw sugar, by applying the adequate crystallization by cooling can be perfectly integrated to the conventional process of manufacturing VHP, VVHP and other types of sugar, in the proportion that is adequate to the demand of each type of sugar, with the advantages of: being a clean technology; not employing resins and additional chemical inputs; not generating new effluents; giving more flexibility to the sugar manufacturing process; aggregating value to the product and reducing the current costs of refined sugar production. It should be further emphasized that the product better fits the international market in that it uses a sugar solution that has not received addition of chemical agents, such as for example, sulfur dioxide, and without using ion exchange resins.

The invention claimed is:

1. Process for sugar crystallization by controlled cooling, which comprises
progressively cooling, in multiple stages arranged in series in a crystallizer, a descending continuous flow of a saturated sucrose solution at an initial temperature of from about 78° to 120° C. in the first stage, to a plurality of stages, maintaining the sucrose solution in each stage under crystallization at a predetermined temperature, until reaching a final temperature from 20° C. to 45° C. in the last stage, effecting the cooling of the sucrose solution in each stage by indirect heat exchange with a heat exchange fluid fed in, and circulated through, the last stage and, circulating the fluid ascendingly, through some portions of the previous stages,
the temperature variation between the stages being defined from the initial temperature in the first stage, by the ratio of the difference between the initial and final temperatures of the sucrose solution to the number of cooling stages, and further comprising initially feeding a saturated sucrose solution in a sucrose solution inlet of the crystallizer and releasing the crystallized mass of said crystallizer through a crystallized mass outlet of the crystallizer.

2. Process, according to claim 1, which comprises inducing the formation of a crystallization germ or crystal seeds, by cooling the sucrose solution in the first cooling stage to produce a supersaturation from 1.01 to 1.20.

3. Process, according to claim 2, which comprises progressively growing the crystal seeds by deposition of sucrose on the surfaces thereof, the sucrose coming from the sucrose solution that is progressively cooled as the solution flows in the descending direction.

4. Process, according to claim 3, which comprises carrying out the progressive cooling of the heated saturated sucrose solution from the initial temperature of the solution until a temperature from about 20.degrees. to 45.degrees. C., in between 5 and 50 stages.

5. Process, according to claim 1, wherein the sucrose solution temperature is defined by the ratio of the difference between the initial and final temperatures of the sucrose solution to the number of cooling stages.

6. Process, according to claim 5, wherein the initial temperature is 95.degrees. and the final temperature is 35.degrees. C., with the provision of 11 cooling stages: in stage 1 the temperature is 95.degree. C., in stage 2 the temperature is 89.degree. C., in stage 3 the temperature is 83.degree. C., in stage 4 the temperature is 77.degree. C., in stage 5 the temperature is 71.degree. C., in stage 6 the temperature is 65.degree. C., in stage 7 the temperature is 59.degree. C., in stage 8 the temperature is 53.degree. C., in stage 9 the temperature is 47.degree. C., in stage 10 the temperature is 41.degree. C. and in stage 11 the temperature is 35.degree. C. and the sucrose solution temperature is defined by the ratio of the difference between the initial and final temperatures of the sucrose solution to the number of cooling stages.

7. Process, according to claim 1, which comprises agitating the sucrose solution between each two consecutive cooling stages, in order to guarantee homogeneity and regularity in the growth and distribution of the crystals and in the locally defined temperature.

8. Process, according to claim 1, which comprises submitting the sucrose solution is to a gradual increase of density, crystal percentage and exhaustion of sucrose from the crystallized sucrose solution, stage by stage, in the descending flow direction.

9. Process, according to claim 8, wherein the gradual density increase in the descending flow direction, stage by stage, allows establishing a descending plug flow.

10. Process, according to claim 1, wherein each stage receives a selective additional supply of heat exchange fluid for maintaining the programmed temperature.

11. Process, according to claim 1, wherein the heat exchange fluid is water at ambient temperature, heated water, saturated steam or superheated water.

12. Process, according to claim 11, wherein the heated water presents a temperature from 60 to 95.degree. C., the saturated steam or the superheated water presenting temperatures of about 115-130.degree. C.

13. Process, according to claim 12, wherein the saturated steam or the superheated water is used in substitution to heated water when a programmed temperature, to be maintained in a determined stage, is above 95. degrees C.

14. Process, according to claim 2, wherein a crystallization seed is prepared in a separate device of the crystallization equipment and then introduced therein in a region in which the supersaturation is from 1.01 to 1.20.

15. Process, according to claim 14, wherein the seed used contains crystals in a mass percentage from 10 to 55%.

16. Process, according to claim 1, wherein the sucrose solution has a purity from 60 to 99.8%.

17. Process, according to claim 1, wherein the sucrose solution is obtained from the concentration of sugar cane juice.

18. Process, according to claim 1, wherein the sucrose solution is obtained from the concentration of sugar cane juice, without using sulfur dioxide.

19. Process, according to claim 1, wherein the sucrose solution is prepared from the dissolution of raw sugar VVHP or VHP or VVHPC or sugar B, or sugar C or mixtures of said sugars, or mixtures thereof with syrup of sugar cane juice.

20. Process, according to claim 1, wherein the sucrose solution is prepared from the dissolution of raw sugar obtained through a manufacture process that does not use juice sulfitation.

21. Process, according to claim 1, wherein the sucrose solution is obtained from the concentration of beetroot juice.

22. Process, according to claim 1, which comprises obtaining the sucrose solution from mixtures of concentrated juice and crystal sugar obtained from beetroot.

23. Process, according to claim 1, wherein the sucrose solution is obtained from crystal sugar obtained from beetroot.

24. Process, according to claim 1, wherein the sucrose solution is obtained from syrup that is discolored in ion exchange and/or activated coal columns.

25. Process, according to claim 1, wherein the sucrose solution is obtained from the mixture of syrup and dissolved raw crystal sugar discolored in ion exchange and/or activated coal columns.

26. Process, according to claim 1, wherein the sucrose solution is obtained from the mixture of syrup and dissolved raw crystal sugar and run-off syrups effluent from the sugar manufacture process and discolored in ion exchange and/or activated coal columns.

27. Process, according to claim 1, wherein the sucrose solution is obtained from the mixtures of syrup and run-off syrup resulting from the sugar manufacture process.

28. Process, according to claim 1, wherein the sucrose solution is obtained from the mixtures of concentrate juice and low purity sugars obtained from the concentration of beetroot juice.

29. Process for sugar crystallization by controlled cooling, which comprises progressively cooling, in multiple stages arranged in series in a crystallizer, a descending continuous flow of a saturated sucrose solution at an initial temperature of from about 78° to 120° C. in the first stage, to a plurality of stages, maintaining the sucrose solution in each stage under crystallization at a predetermined temperature, until reaching a final temperature from 20° C. to 45° C. in the last stage, effecting the cooling of the sucrose solution in each stage by indirect heat exchange with a heat exchange fluid fed in, and circulated through, the last stage and, circulating the fluid ascendingly, through some portions of the previous stages, each stage receiving a selective additional supply of heat exchange fluid for maintaining the programmed temperature, the temperature variation between the stages being defined from the initial temperature in the first stage, by the ratio of the difference between the initial and final temperatures of the sucrose solution to the number of cooling stages and further comprising initially feeding a saturated sucrose solution in a sucrose solution inlet of the crystallizer and releasing the crystallized mass of said crystallizer through a crystallized mass outlet of the crystallizer, and wherein the heat exchange fluid is water at ambient temperature, heated water, saturated steam or superheated water.

\* \* \* \* \*